United States Patent [19]

Suman et al.

[11] Patent Number: 5,154,617

[45] Date of Patent: Oct. 13, 1992

[54] MODULAR VEHICLE ELECTRONIC SYSTEM

[75] Inventors: Michael J. Suman; Sheldon J. Watjer, both of Holland, Mich.

[73] Assignee: Prince Corporation, Holland, Mich.

[21] Appl. No.: 705,305

[22] Filed: May 24, 1991

Related U.S. Application Data

[60] Division of Ser. No. 535,337, Jun. 8, 1990, Pat. No. 5,040,990, which is a continuation of Ser. No. 350,014, May 9, 1989, abandoned.

[51] Int. Cl.⁵ .................. H01R 13/66; H01R 9/07
[52] U.S. Cl. .................... 439/34; 296/37.7; 307/10.1
[58] Field of Search ............ 296/37.7; 307/10.1; 361/352, 393, 395; 439/34, 35, 36, 43, 49, 53

[56] References Cited

U.S. PATENT DOCUMENTS

| | | | |
|---|---|---|---|
| 3,154,365 | 10/1964 | Crimmins | 439/496 |
| 3,174,576 | 3/1965 | Woofter et al. | |
| 3,270,831 | 9/1966 | Woofter et al. | |
| 3,590,136 | 6/1971 | Kumishi et al. | 174/50 |
| 3,635,305 | 1/1972 | Kunishi et al. | 180/90 |
| 3,707,697 | 12/1972 | Izumi | |
| 3,753,207 | 8/1973 | Maheux et al. | 439/496 |
| 4,100,372 | 7/1978 | Hypolite | 179/1 G |
| 4,119,794 | 10/1978 | Matsuki | 174/68 R |
| 4,133,405 | 6/1979 | Turek | 180/90 |
| 4,153,127 | 5/1979 | Klink et al. | 180/65 |
| 4,241,870 | 12/1980 | Marcus | 296/37.7 |
| 4,372,410 | 2/1983 | Loken et al. | 180/89 |
| 4,421,190 | 12/1983 | Martinson et al. | 180/90 |
| 4,474,420 | 10/1984 | Nestor | 439/77 |
| 4,505,054 | 3/1985 | Clark et al. | 33/357 |
| 4,620,268 | 10/1986 | Ferenc | 362/74 |
| 4,784,615 | 11/1988 | Teng-Hong | 439/496 |
| 4,806,118 | 2/1989 | Herrmann | 439/621 |
| 4,818,010 | 4/1989 | Dillon | 296/37 |
| 4,824,164 | 4/1989 | Nakayama et al. | 296/146 |
| 4,844,533 | 7/1989 | Dowd et al. | 296/214 |
| 4,869,670 | 9/1989 | Ueda et al. | 439/34 |
| 4,950,168 | 8/1990 | Watanabe et al. | 439/34 |

FOREIGN PATENT DOCUMENTS

| | | | |
|---|---|---|---|
| 219440 | 9/1988 | Japan | 296/37 |
| 227441 | 9/1988 | Japan | 439/34 |

Primary Examiner—Gary F. Paumen
Attorney, Agent, or Firm—Price, Heneveld, Cooper, DeWitt & Litton

[57] ABSTRACT

A modular interchangeable electronic system for providing a number of different options for a vehicle which can be selectively plugged into a base unit. The base unit can receive or be replaced by selected optional units which interface with vehicle controls or provide desired control or display functions.

10 Claims, 5 Drawing Sheets

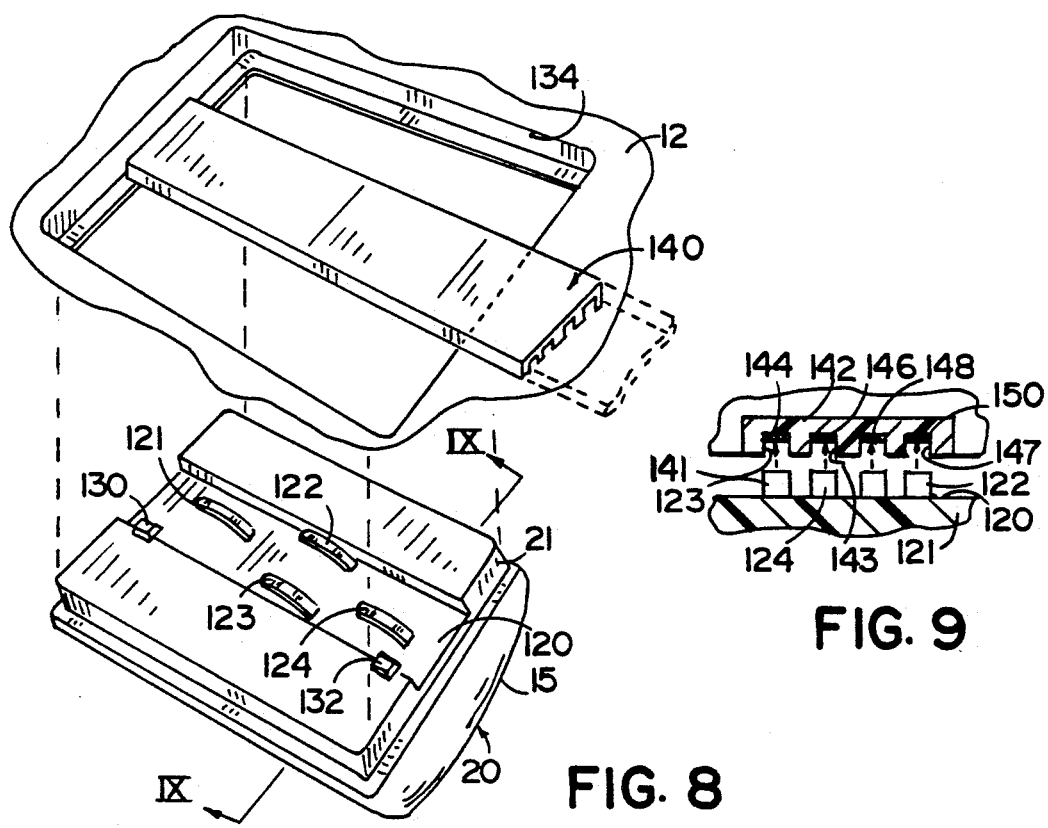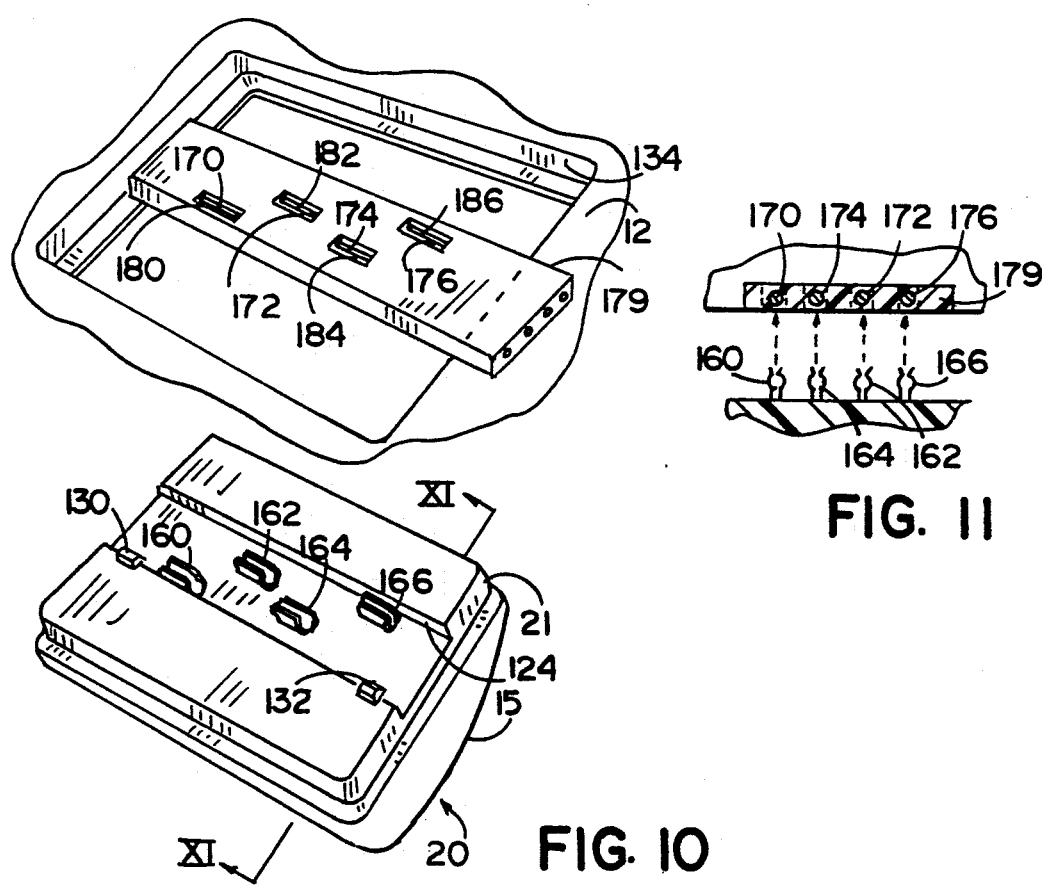

MODULAR VEHICLE ELECTRONIC SYSTEM

This is a division of U.S. application Ser. No. 535,337, filed Jun. 8, 1990 now U.S. Pat. No. 5,040,990, which is a continuation of Ser. No. 350,014 filed on May 9, 1989 and now abandoned.

BACKGROUND OF THE INVENTION

The present invention pertains to an electronic modular display and control system for use in a vehicle and particularly one which allows installation of several optional modular units for different control and display functions.

In recent years, vehicles such as automobiles, have begun using display systems located in areas different than the typical dashboard area. One such installation is a console mounted in the center roof area between the vehicle visors and which includes both an electronic compass and a garage door opening transmitter housing. Such a system is shown in U.S. Pat. No. 4,505,054 issued Mar. 19, 1985 to the present assignee. This unit can be purchased by the vehicle owner as an optional accessory or comes as standard equipment on some vehicles.

Although vehicles have included these types of displays as well as other overhead counsel displays for providing for example, a systems check for a variety of control functions and engine operating parameters; systems today have not allowed either the user or the vehicle dealer to provide optional accessories after the purchase of the vehicle without major installation requirements.

SUMMARY OF THE INVENTION

The system of the present invention provides a modular interchangeable electronic system for providing a number of different options which can be plugged into a base unit to provide selected options for the vehicle purchaser either at the time of purchase of later. Systems embodying the present invention include a base unit which is mounted to a socket which is standard on all vehicles. The base unit can receive or be replaced by selected optional units which interface with vehicle controls or provide desired display functions. Each unit includes means for programming the unit for interfacing with the vehicle once installed.

With such a system, vehicles can be made with a base level overhead module which can be upgraded with selected options and which options can be selectively changed subsequent to the purchase of the vehicle by plugging in different modules.

These and other features, objects and advantages of the present invention will become apparent upon reading the following description thereof together with reference to the accompanying drawings, in which:

BRIEF DESCRIPTION OF THE DRAWINGS

FIG. 8 is a perspective exploded view of an alternate mounting system for the modules of the present invention;

FIG. 9 is a fragmentary cross-sectional view taken along section lines IX—IX of FIG. 8;

FIG. 10 is an exploded fragmentary view of an other alternate mounting system for the modules of the present invention; and FIG. 11 is a fragmentary cross-sectional view of the structure shown in FIG. 10 taken along section lines XI—XI of FIG. 10;

DETAILED DESCRIPTION OF THE PREFERRED EMBODIMENT

Figure 1:
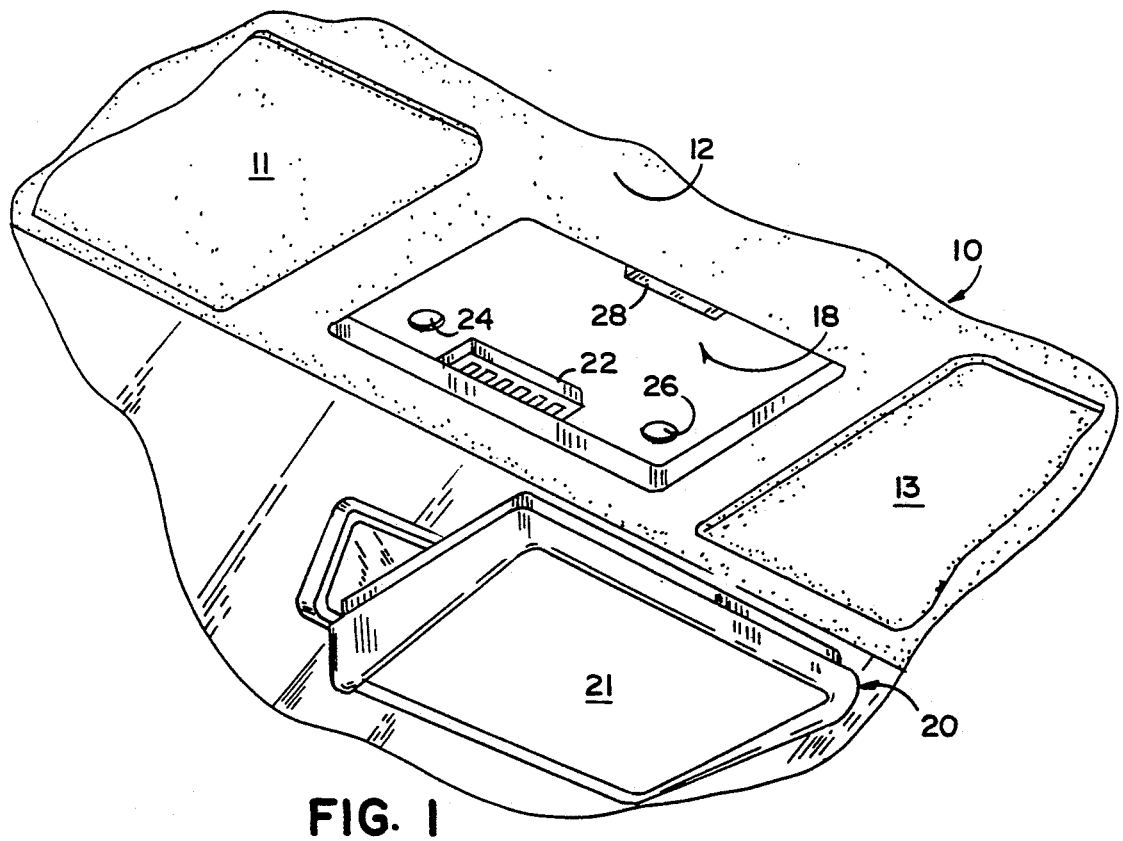
FIG. 1 is a fragmentary perspective view partly exploded of a vehicle including a socket with an elementary plug-in module.

Referring initially to FIG. 1, there is shown a vehicle 10 having a roof 12 and windshield 14 to which a rearview mirror 16 is attached in a conventional manner. Attached to the vehicle roof are a pair of visors 11 and 13 on either side of the center area of the roof which includes a recess 18 including a socket 22 for receiving a variety of plug-in modules such as a base module 20 shown. Recess 18 accordingly includes both mechanical and electrical interconnection means with the system illustrated in FIG. 1 including a plug-in electrical socket 22, a pair of guide apertures 24 and 26, and a mechanical latch 28 which mate with correspondingly shaped and configured electrical and mechanical connectors included in the base unit 20. Thus unit 20 will include an electrical plug 27 (FIG. 5) which is aligned with and mates with the electrical socket 22, a pair of posts (not shown) which mechanically align and interfit within circular apertures 24 and 26 in the roof structure and a resilient or moveable latch member which interlocks with latch 28 for snap fitting module 20 within recess 18. A few of the various different modules which can either be incorporated in the base unit or plugged into the base unit which in turn is plugged into socket 22 are shown pictorially in FIG. 2.

Figure 2:
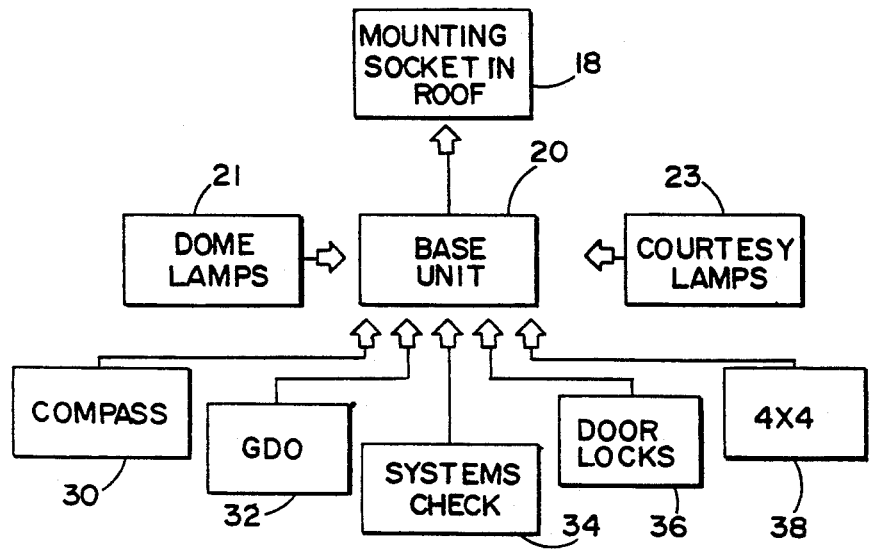
FIG. 2 is a block diagram illustrating a variety of optional plug-in modules which can be used with the system shown in FIG. 1.
Figure 3:
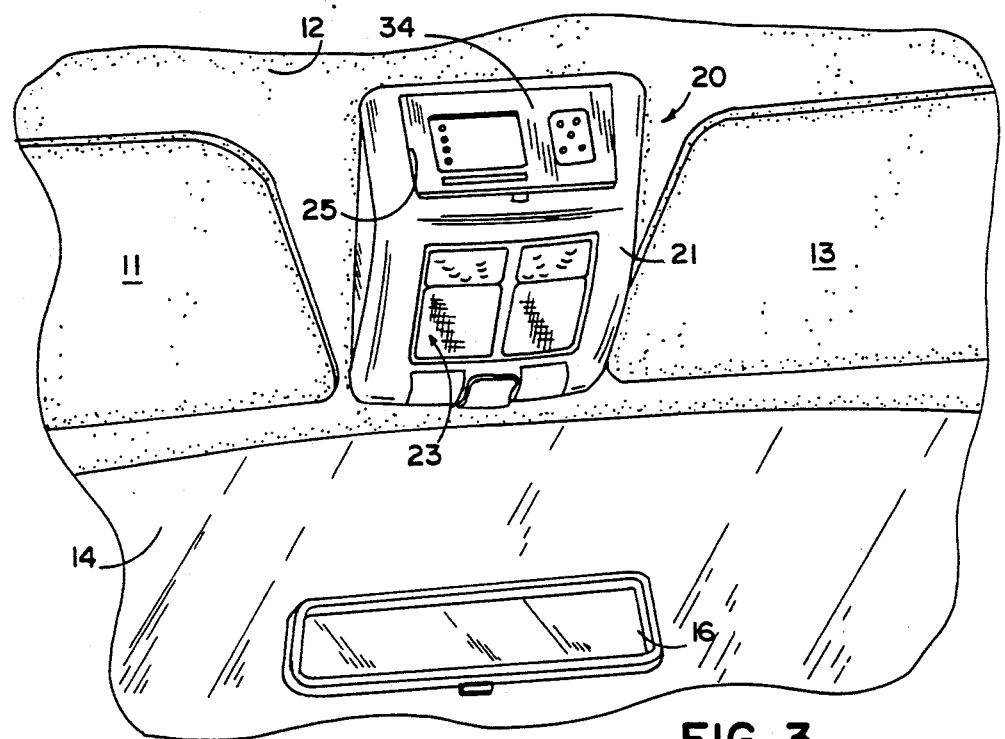
FIG. 3 is a fragmentary perspective view of a vehicle showing a systems check module with a courtesy lamp option installed therein.
Figure 4:
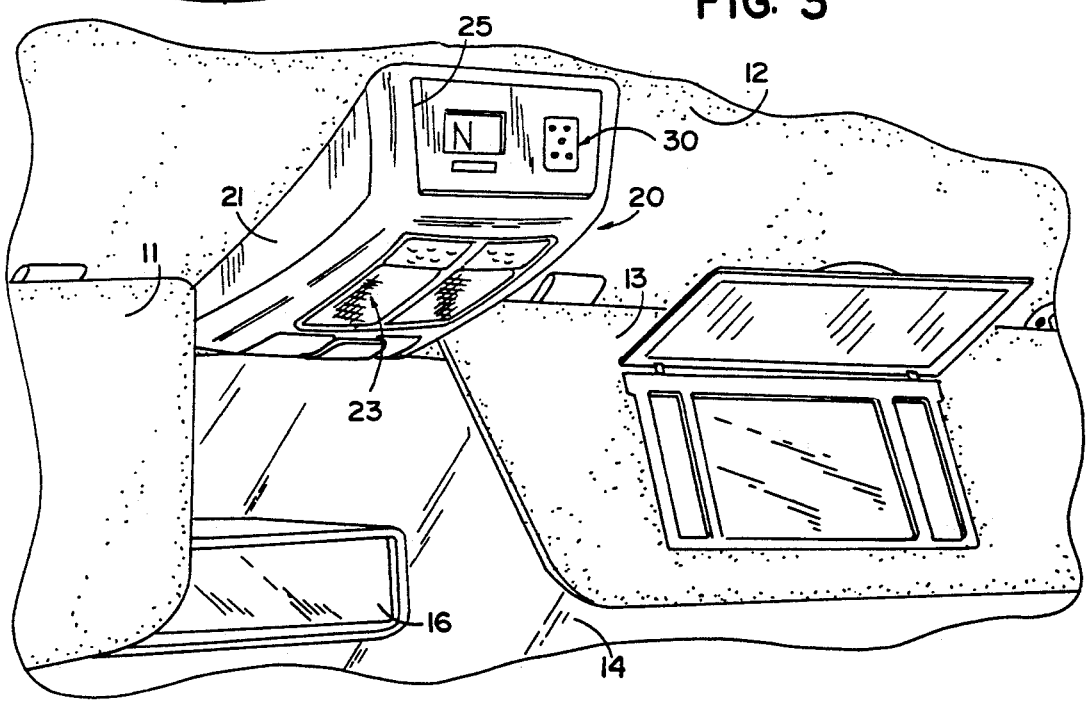
FIG. 4 is a fragmentary perspective view of a vehicle showing a compass module and courtesy lamp option installed therein.
Figure 5:
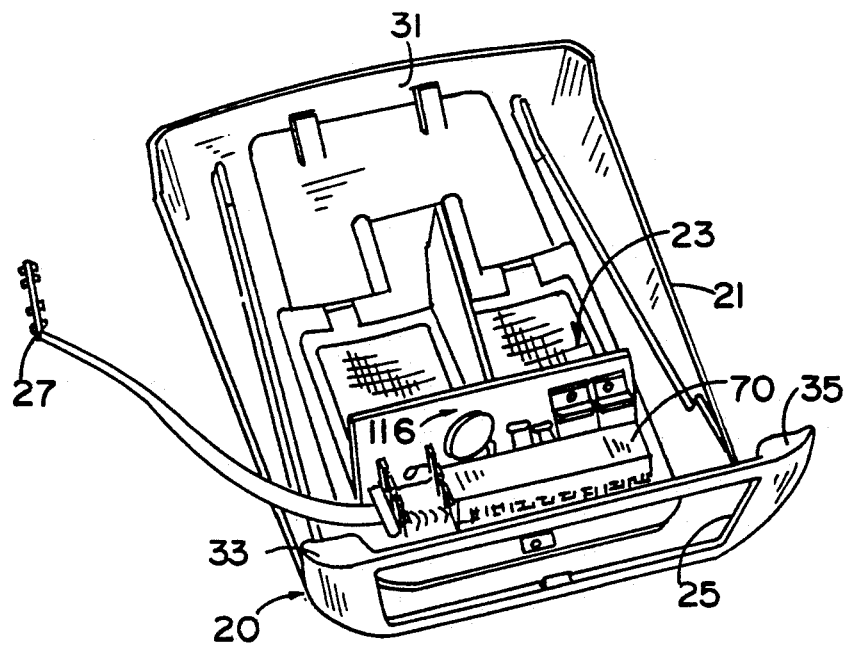
FIG. 5 is a top perspective view of the base housing shown in FIG. 2 and 3.

In FIG. 2, the base unit 20 may include a simple dome lamp 21 as seen in FIG. 1 or individually operated courtesy lamps 23 as seen in FIGS. 3, 4 and 5 embodiments of the invention. In addition, the base unit 20 may include a base module housing 21 (FIGS. 4 and 5) with an opening 25 for receiving plug-in modules such as a systems check module 34 (FIG. 3), a compass module 30 (FIG. 4), a garage door opening module 32, a door-lock control module 36, or a 2-wheel/4-wheel drive control and display module 38. It is understood that each of these modules of the embodiment shown in FIG. 2-7 plug into the base unit housing 21 which in turn plugs into the recess 18 and electrically plugs into socket 22 as seen in FIG. 1.

Figure 6:
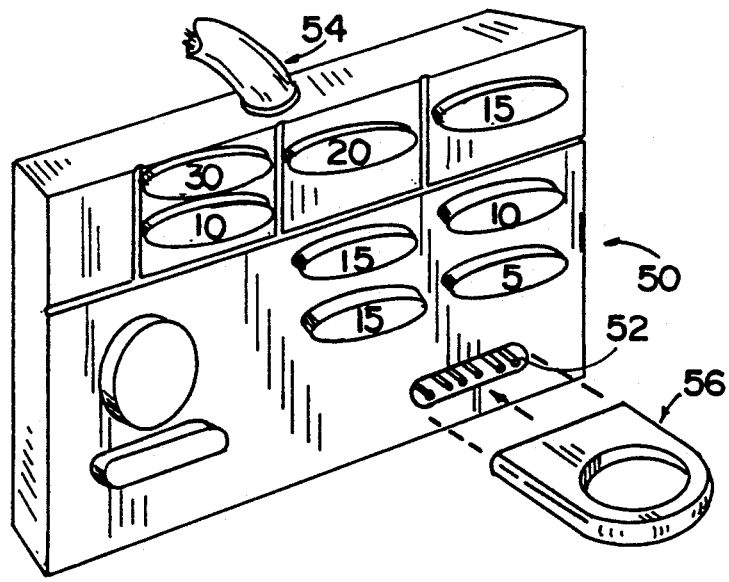
FIG. 6 is a fragmentary perspective view of a programming jumper system for connecting the vehicle wiring system to the selective module.

In order to provide a universal interface between the selected optional module and the vehicle power supply, vehicle device being controlled, or parameter being displayed; program means is provided which in the preferred embodiment is a typical automotive fuse box 50 which is modified to be programmable by insertion of a selected plug-in program module 56 as shown in FIG. 6. The fuse box 50 includes a multiple pin electrical socket 52 mounted therein which is connected by a multiple conductor cable 54, as shown in greater detail in FIG. 7, to various vehicle supply and control units as well as to electrical socket 22 of recess 18 in the vehicle roof 12. The various pins of socket 52 in fuse box 50 are shown in detail in FIG. 7 and receive a predetermined programming plug-in programming member 56 which includes a corresponding number of pins which mate with socket 52 and which are interconnected to connect predetermined ones of the socket connections to each other as described in greater detail in contain with FIG. 7.

Figure 7:
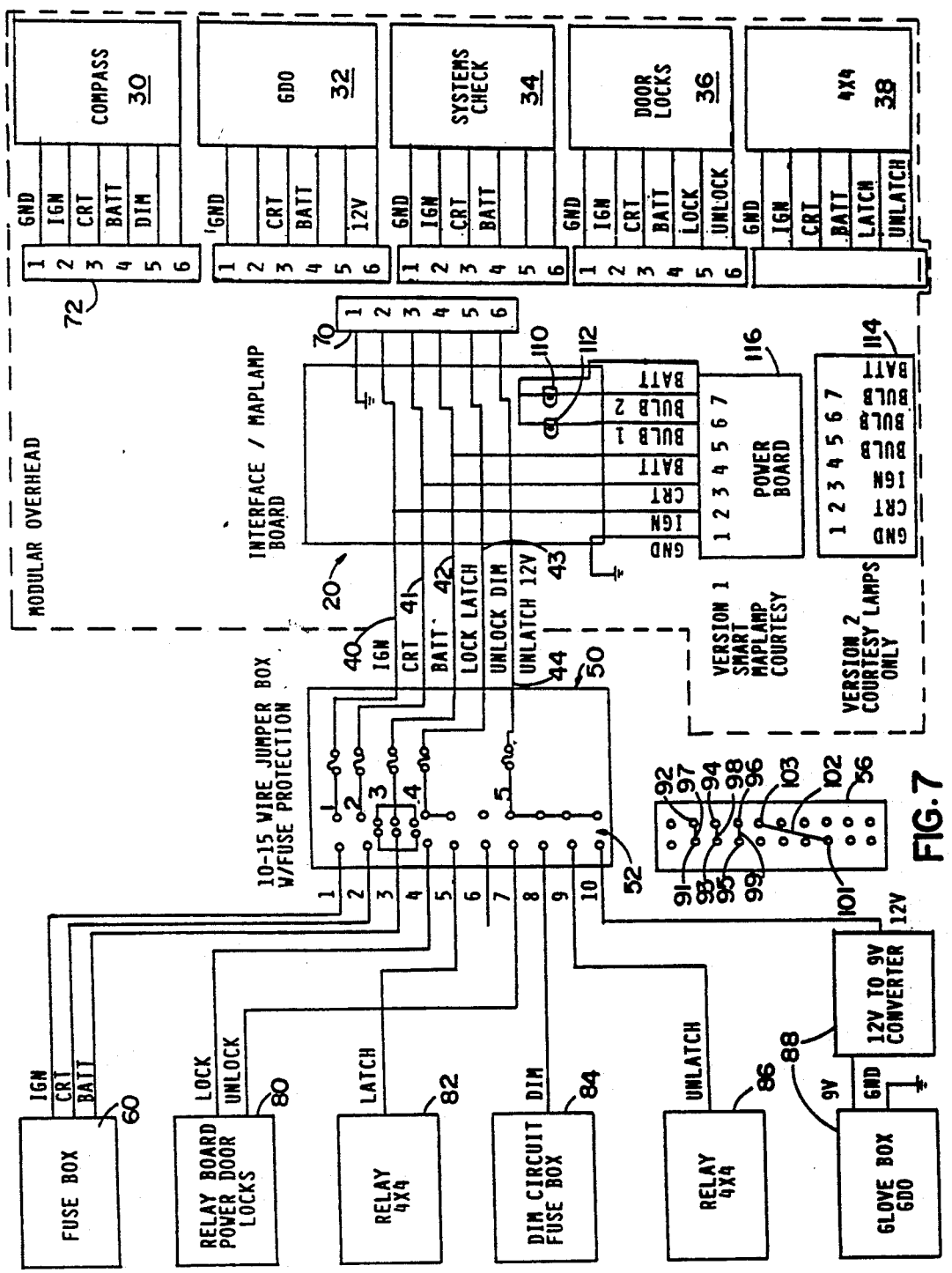
FIG. 7 is an electrical circuit diagram partially in block and schematic form showing the wiring of the system of the present invention.

Referring now to FIG. 7, cable 54 includes 10 conductors numbered 1 through 10 which extend to and are coupled to a variety of vehicles supply and control circuits such as circuits 60, 80, 82, 84, 86 and 88. Cable 54 also includes, within the outer sheath thereof, output conductors 40, 41, 42, 43 and 44 which are selectively programmably coupled to ones of the input conductors 1-10 through the programming module 56. Module 56 in the preferred embodiment therefore essentially comprise a selective shorting bar which plugs into socket 52 for coupling conductors of cable 54 together.

As an example, with respect to the FIG. 4 embodiment utilizing the compass module 30, the aligned top three pins 91, 93 and 95 are shorted to pins 92, 94 and 96 respectively of program module 56 by conductors 97, 98 and 99. When module 56 is plugged into fuse box 50, the ignition conductor 1, the courtesy power conductor 2, and the battery power conductor 3 from a part of the vehicle's fuse box 50 show schematically as block 60 in FIG. 7 are thus coupled to conductors 40, 41 and 42 of cable 54 which in turns are coupled to pins 2, 3 and 4 on socket 70 contained within a base unit 20. The compass module 30 which plugs into the base unit housing 21 includes a corresponding plug 72 corresponding to socket 70 such that when interconnected with the corresponding pin numbers indicated in FIG. 6, the pins 2, 3 and 4 will be coupled to conductors 40, 41 and 42 in turn coupled to conductors 1-3 of cable 54 through programmed connector 56 identified as the compass connector. Module 56 also has pin 101 electrically coupled to pin 103 by conductor 102 to couple conductor 8 of cable 54 to conductor 43 and thus provide a dimming control signal to the compass module through interconnected pins plug 72 and socket 70.

Other modules such as the systems check module 34 illustrated in FIG. 3 will have different programmed connectors 56 programmed to similarly connect the conductors of cable 54 to one another for supplying either power to or signals to and from their respective module and associated vehicle control unit. The vehicle units include a relay board 80 for the power locks, a control relay for 82 controlling the 2-wheel/4-wheel drive unit, a dimmer circuit control 84, a trunk unlocking relay control board 86 and a regulated 12 volt control circuit 88.

The base module 20 as seen in FIGS. 1, 5 and 7 may include a pair of courtesy lamps 110 and 112 (FIG. 7) controlled by a first or second electrical control circuit such as a simplified circuit 114 used for activating the FIG. 1 embodiment lights or a more sophisticated control circuit 116 shown in the embodiments of FIGS. 5 and 7 whereby independent map lamps are provided with slow on and off capability. Typically the base unit will include one or the other of circuits 114 and 116 and more typically circuit 116 with the ability to receive the optional modules such as modules 30, 32, 34, 36 or 38 each of which includes a plug which correspondingly aligns with an electrically couples the individual module to socket 70 in the base unit 20 within housing 21 thereof. Each of the modules are thus shaped as seen in FIGS. 3 and 4 to fit within the generally rectangular aperture 25 of the base unit housing 21 which housing can be attached to the vehicle headliner in a variety of manners including a rear snap fitting latch 31 and snap fitting front tabs 33 and 35 as seen in FIG. 5 which mate with corresponding brackets mounted within recess 18 as an alternative to the structure shown in FIG. 1. There are also a variety of manners in which the base units can be coupled to conductors 40-44 and two examples of such interconnections are shown in the remaining FIGS. 8-11 now described. It is understood that the ground conductor connection for the various modules is typically made through connection to the select sheet metal structure of the vehicle and is not separately described.

Referring initially to FIGS. 9 and 10, the base module 20 shown therein may include for example a dome light 115 of the type controlled by a circuit 114 associated with the base unit and a housing 21 which includes a longitudinally recessed track 120 having a plurality of curved spaced aligned contacts 121, 122, 123 and 124 extending outwardly from the upper surface of recess 120. Contacts 121-124 can be made of beryllium copper or other spring-like conductive material and are coupled to the courtesy lamps 110 and 112 contained within dome light 115 or pins of a connector 70 contained within a base module if the module is designed for receiving a plurality of display and control modules such as 30, 32, 34, 36 or 38. Housing 21 shown in FIG. 8 includes latch means 130 and 132 shown schematically in FIG. 8 for snap locking the base unit 20 within a recess 134 in the vehicle roof 12. Extending longitudinally across recess 134 is a ribbon-like connector 140 made of a generally rectangular (in cross-section) piece of flexible polymeric non-conductive material 142 (FIG. 9) having longitudinally extending slots 141, 143, 145 and 147 formed therein into which there is inlaid elongated electrical contact strips 144, 146, 148 and 150. Strips 144, 146, 148 and 150 engage as illustrated in FIG. 9 when base unit 20 is snapped into position within recess 134, the spaced electrical contacts 121, 122, 123 and 124 for transferring power to or signals to and from the vehicle control to which the contacts strips 144, 146, 148 and 150 are coupled and the base unit 20. In FIGS. 8 and 9 only four contacts and contact strips are shown in being understood that the unit may include as many as necessary for intercoupling the base unit to the socket defined by recess 134 and connector strip 140. Strip 140 may extend from the front windshield area of the vehicle to the back window for also applying power to rear seat accessories such as overhead drop down vanity mirrors, and rear window brake lights.

An alternate method of coupling the housing 21 of base unit 20 is shown in FIGS. 10 and 11 in which the housing 21 includes a plurality of electrical spring clips 160, 162, 164 and 166 which are spaced in staggered relationship along the longitudinal axis of the recess 120 formed in base housing 21. The clips snap fit over conductors 170, 172, 174 and 176. Which are embedded in a polymeric base 180 which is cut away in rectangular areas aligned with connector clips 160, 162, 164 and 166 as illustrated by recesses 179, 182, 184 and 186. The spring clips thus fit within the base 180 and electrically and mechanically engage the conductors when housing 21 is snapped fitted within recess 134 in the headliner 12. Again as with conductor strip 140, connector 179 may include a greater number of conductors extending in parallel relationship and aligned with a greater number of contact clips associated with base housing 21.

These and other modifications to the preferred embodiments of the invention as described herein can be made by those skilled in the art without departing from the spirit or scope of the invention as defined by the appended claims.

The embodiments of the invention in which an exclusive property or privilege is claimed are defined as follows:

1. An electrical connector for coupling a plug-in module to a vehicle panel having a module receiving recess, the electrical connector comprising:
   a cable including a substrate of insulating material and a plurality of spaced generally parallel conductors mounted therein, said cable carried on the panel and extending uninterrupted across the module receiving recess of the panel such that said conductors extend across said recess; and
   an electrical module including a housing, said electrical module including electrical means for providing at least one of a control option, a display option or a lamp for the vehicle, said electrical means carried within said module housing, said module housing shaped to be mounted in said recess and including contact means for engaging at least predetermined ones of said spaced conductors, said contact means coupled to said electrical means whereby said contact means contact said conductors to electrically couple said electrical means to said conductors when said housing is assembled in the module receiving recess.

2. The connector as defined in claim 1 wherein said substrate includes elongated grooves for receiving said conductors inlaid therein and wherein said contact means comprises spring contacts which extend into said grooves to contact said conductors.

3. The connector as defined in claim 1 wherein said substrate includes a plurality of openings for exposing sections of said conductors and wherein said contact means comprises spring clips aligned with said openings to engage said conductor when said module mounted within said recess.

4. The electrical connector as defined in claim 1, wherein said plurality of conductors include at least three conductors carried within said substrate.

5. An electrical connector for coupling a plug-in module to a vehicle headliner comprising:
   a substrate of insulating material including a plurality of spaced generally parallel conductors mounted therein, said substrate carried on the panel such that it extends across at least one module receiving recess formed in the vehicle headliner, whereby said conductors extend uninterrupted across the at least one module receiving recess of the vehicle headliner; and
   an electrical module including a module housing and an electrical accessory providing at least one of a control option, a display option, or a lamp for the vehicle, said accessory carried within said housing, said module housing shaped to be mounted in said recess, said electrical module including contact means coupled to said electrical accessory, for engaging at least predetermined ones of said spaced conductors which extend across the recess whereby said electrical accessory is electrically connected to said conductors when said module is mounted in the headliner recess.

6. The connector as defined in claim 5 wherein said substrate includes elongated grooves for receiving said conductors inlaid therein and wherein said contact means comprises spring contacts which extend into said grooves to contact said conductors.

7. The connector as defined in claim 5 wherein said substrate includes a plurality of openings for exposing sections of said conductors and wherein said contact means are aligned to engage said conductor when said module mounted within said recess.

8. A vehicle panel assembly for a vehicle comprising:
   a vehicle panel including at least one aperture;
   a substrate of insulating material mounted to the panel and including a plurality of spaced generally parallel conductors carried within said substrate, at least one of said conductors extending uninterrupted across said at least one aperture; and
   an electrical module including a housing, said housing including an electrical accessory providing at least one of a control option, a display option, or a lamp, said housing adapted to be mounted in said aperture, said electrical module including contact means coupled to said electrical accessory for engaging said at least one of said conductors, whereby said contact means engage said at least one of said electrical conductors extending across said at least one aperture to provide an electrical connection between said module and said conductors in said panel when said module housing is mounted in said aperture.

9. The socket as defined in claim 8 wherein said substrate is a headliner and further including a generally ribbon-like insulator which includes elongated grooves for receiving inlaid conductors and wherein said contact means comprises spring contacts which extend into said grooves to contact said conductors.

10. The connector as defined in claim 8 and further including a generally ribbon-like insulator surrounding said conductors and including a plurality of openings for exposing a section of said at least one conductor in the area of said recess and wherein said contact means engages said at least one conductor when said module is mounted within said recess.

* * * * *